Figures 1, 2:
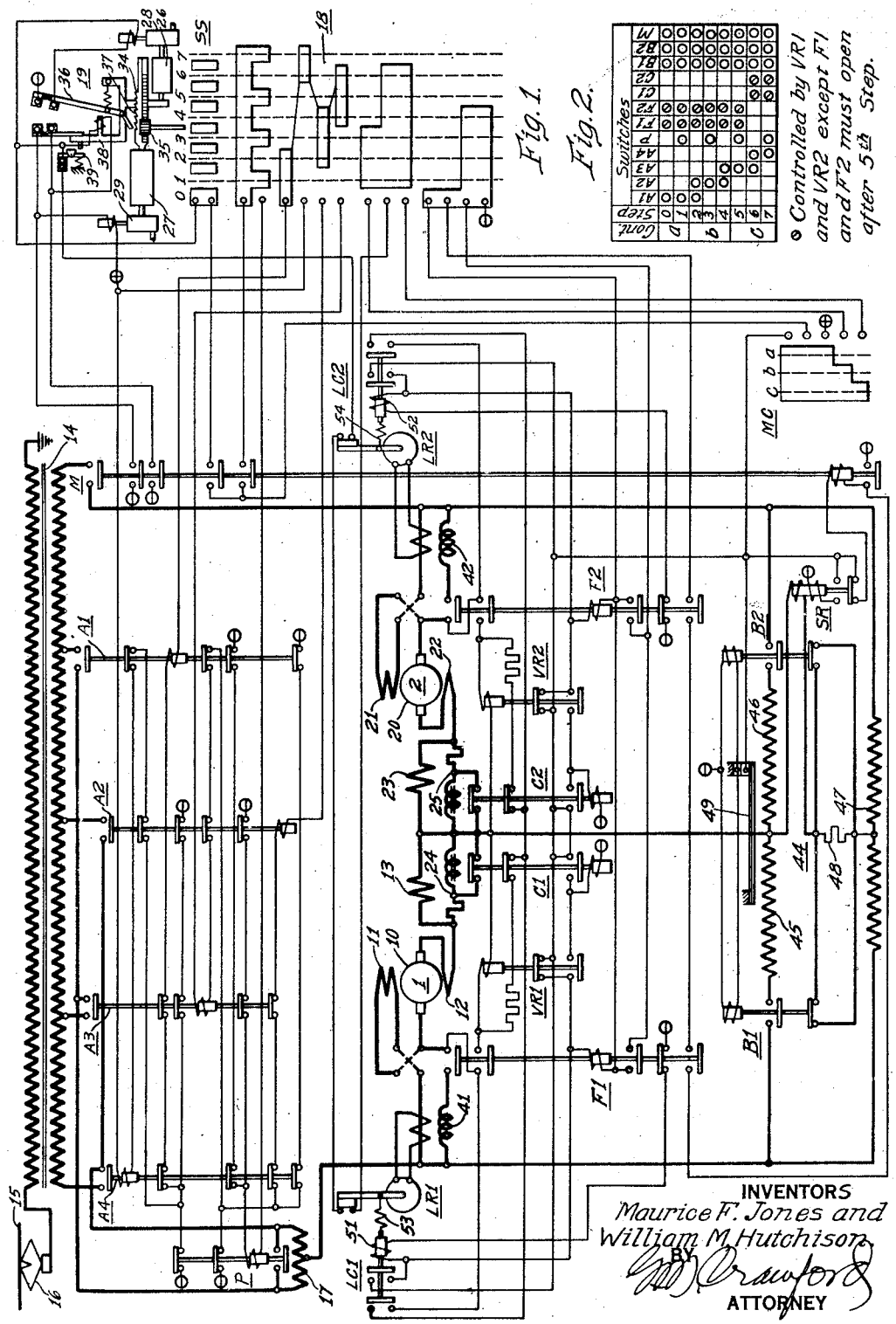

Oct. 24, 1944.   M. F. JONES ET AL   2,361,210
CONTROL SYSTEM
Filed Nov. 19, 1942

INVENTORS
Maurice F. Jones and
William M. Hutchison
BY
ATTORNEY

Patented Oct. 24, 1944

2,361,210

UNITED STATES PATENT OFFICE 2,361,210

CONTROL SYSTEM

Maurice F. Jones, Wilkinsburg, and William M. Hutchison, Pittsburgh, Pa., assignors to Westinghouse Electric & Manufacturing Company, East Pittsburgh, Pa., a corporation of Pennsylvania Application November 19, 1942, Serial No. 466,140

15 Claims. (Cl. 172—179)

Our invention relates, generally, to control systems and, more particularly, to systems for controlling the operation of the propelling motors of electric locomotives and vehicles.

As explained in the copending application of L. J. Hibbard, Serial No. 466,137, filed November 19, 1942, it is necessary to provide some means for controlling the slipping speed of series-connected motors which drive railway vehicle axles. Otherwise, the speed may become dangerous to the motor driving the slipping axle. Furthermore, slipping of the driving wheels reduces the tractive effort of the vehicle.

A mathematical analysis of the conditions involved indicates, and actual operating experience has proven, that parallel-connected motors operate more satisfactorily from the standpoint of wheel slippage than do series-connected motors. However, the utilization of parallel-connected motors is considered impractical in many cases because of the increased current which the switching and control equipment is required to handle.

Numerous anti-slip relay schemes have been proposed for stopping the slipping action. It has also been proposed to compensate for weight transfer by impressing less voltage on the leading axle motor than on the trailing axle motor, thereby reducing the tendency of the leading axle to slip.

As explained in the aforesaid copending application of L. J. Hibbard, the prior schemes have not proven entirely satisfactory and the aforesaid application discloses a control system for series-connected motors that secures anti-slipping results which are substantially the equivalent of those obtained with parallel-connected motors.

An object of our invention is to provide an improved system for controlling the slipping of the driving wheels of electric locomotives and vehicles.

A principal object of this invention is to prevent the reduction of the tractive effort of a railway vehicle below the critical operating point in the event of the slippage of one or more axles of the vehicle.

Another object of our invention is to provide a system for automatically controlling the acceleration of a plurality of traction motors in which the progression of the control is governed by the current in a non-slipping motor.

A further object of our invention is to provide a wheel-slippage control system which shall maintain the correct main field and commutating field strength on each of the two motors, or multiples thereof, for the speed and load conditions under which the motors are required to operate.

Still another object of our invention is to protect the motors and the control apparatus of a motor control system against an excessive unbalance of either motor current or voltage.

Other objects of our invention will be explained fully hereinafter or will be apparent to those skilled in the art.

In accordance with our invention, a balancing auto-transformer is connected across two motors, or multiples thereof, to limit the motor speed to a safe value in case of wheel slippage. Limit relays are so connected in the motor circuits that progression of the accelerating control is governed by a motor which does not slip and, therefore, has normal accelerating current. A temperature responsive device and a relay responsive to an unbalance in the motor voltages cooperate to protect the balancing transformer and the motors against an excessive unbalance of either motor current or voltage.

For a fuller understanding of the nature and objects of our invention, reference may be had to the following detailed description, taken in conjunction with the accompanying drawing, in which:

Figure 1 is a diagrammatic view of a control system embodying our invention, and Fig. 2 is a chart showing the sequence of operation of part of the apparatus illustrated in Fig. 1.

Referring to the drawing, the system shown therein comprises a pair of alternating current motors 1 and 2 which may be of a type suitable for propelling an electric vehicle (not shown), a main transformer 14 which may be energized from a trolley conductor 15 through a current collector 16, a switch M for connecting the motors 1 and 2 to the secondary winding of the transformer 14, a plurality of tap-changing switches A1, A2, A3 and A4 for progressively increasing the voltage applied to the motors 1 and 2, the usual preventative coil 17 for preventing a short circuit between the connections to the transformer 14 during the operation of the tap-changing switches and a switch P for obtaining intermediate steps of voltage during the operation of the tap-changing switches.

The operation of the tap-changing switches is controlled by a sequence switch SS which comprises a drum controller 18 and a notching mechanism 19 for operating the controller 18 in a step-by-step manner. The sequence switch SS is preferably of the type disclosed in Patent No. 1,987,709, issued January 15, 1935 to L. G. Riley, and comprises fluid operated pistons disposed in cylinders 26 and 27, magnet valves 28 and 29 for controlling the flow of pressure fluid to the cylinders 26 and 27, respectively, a rack 34 and pinion 35 for driving the drum 18, a trigger 36 for engaging teeth 37 on the rack 34, a trigger magnet 38 for actuating the trigger 36 and a repeater switch 39 for causing a repetition of the operating stroke of the piston disposed in the cylinder 26.

Since the operation of the notching mechanism is fully described in the aforesaid patent, it is believed unnecessary to describe it in detail in the present application. Briefly, the notching mechanism 19 advances the controller drum 18 step-by-step upon the operation of a master controller MC to energize the magnet valves of the sequence switch. As the controller drum 18 is advanced, the tap-changing switches A1, A2, A3 and A4 are closed in sequential relation to increase the voltage applied to the motors 1 and 2. The switch P is also closed at predetermined times to provide intermediate steps in the voltage in a manner well known in the art. The tap-changing switches and the switch P are provided with the usual protective interlocks for preventing improper operation of these switches. The operation of the sequence switch is normally under the control of limit relays LR1 and LR2 which function to stop the progression of the sequence switch in the event that the motor current exceeds a predetermined value, as will be explained more fully hereinafter.

In accordance with the usual practice, the motors 1 and 2 are each provided with an auxiliary or compensating winding and an interpole or commutating winding in addition to a main series field winding. Thus, the motor 1 is provided with an armature winding 10, a main field winding 11, a compensating field winding 12, and a commutating field winding 13. Likewise, the motor 2 is provided with an armature winding 20, a main field winding 21, a compensating field winding 22, and a commutating field winding 23. Also, in accordance with the usual practice in the operation of electric motors, the motors 1 and 2 are connected in series-circuit relation, thereby reducing the current that must be handled by the tap-changing switches.

In order to secure proper commutation of the motors, a commutating or interpole shunt 24 is provided for the commutating field winding 13 of the motor 1 and a similar shunt 25 is provided for the commutating field winding 23 of the motor 2. The purpose of these shunts is explained fully in Patent No. 1,922,737, issued August 15, 1933 to H. G. Jungk. The effective values of the shunts 24 and 25 are controlled by switches C1 and C2, respectively, the operation of which is controlled by relays VR1 and VR2, respectively, as will be more fully described hereinafter. A field shunting switch F1 is provided for shunting the main field winding 11 through a reactor 41 and a field shunting switch F2 is provided for shunting the main field winding 21 through a reactor 42. The operation of the switches F1 and F2 is also controlled by the relays VR1 and VR2, respectively.

As explained in the aforesaid copending application, considerable trouble has been experienced in the operation of electric locomotives and vehicles with slippage of the wheels driven by the motors. In order to control the wheel slippage, a balancing transformer or anti-slip preventive coil 44 is provided. The transformer 44 comprises two windings 45 and 46 which are disposed in mutually inductive relationship and have a 1:1 ratio. As shown, the winding 45 is connected in parallel-circuit relation to the motor 1 and the winding 46 is connected in parallel-circuit relation to the motor 2, the midpoint between the windings 45 and 46 being connected to the midpoint between the motors 1 and 2.

In order to avoid poor commutation of the motors during wheel slippage, the main field winding as well as the additional field windings for each motor are included in the parallel connections for that motor. In this manner, the commutation constants of the motors are not affected by the functioning of the balancing transformer 44.

As explained in the aforesaid copending application, in the event that one of the axles, for example the number 1 axle which is driven by the motor 1 starts to slip, the voltage of this motor increases, thereby causing a portion of the line current to flow through the transformer winding 45. This causes a similar amount of current to flow through the winding 46 which, in turn, maintains the current in the motor 2, substantially at the same value as that before slipping occurred. In this manner, the torque on the slipping motor is reduced but the torque on the non-slipping motor is maintained at substantially normal value, thereby producing a combined tractive effort sufficient to climb the critical grades.

As explained hereinbefore, the results obtained by utilizing the balancing transformer 44 are similar to those obtained for parallel operation of the motors 1 and 2. A mathematical analysis of the problems involved indicates that the balancing transformer limits the speed of the slipping motor to a safe value. Furthermore, since the leading axle of a vehicle is usually the slipping axle, because of weight transfer, the wheels of the leading axle clean the rail, thereby increasing the adhesion of the trailing axle and increasing the tractive effort of the locomotive.

Therefore, there is no apparent need for either a slip relay or a progression hold relay such as has been provided or proposed in previously known systems. However, in the present system, we provide a slip or differential protective relay SR in order to protect the motors and balancing transformer 44 against short circuits or grounds. The actuating coil of the relay SR is connected across the midpoint between the motors 1 and 2 and the midpoint of a reactor 47. A resistor 48 is normally connected in series-circuit relation with the actuating coil of the relay SR. Accordingly, under normal operating conditions, the relay SR does not function.

In order to protect the balancing transformer 44 and the motors against an extraordinary amount and duration of unbalance or motor current, a thermally responsive device 49 may be provided for controlling the operation of a pair of switches B1 and B2 to disconnect the transformer windings 45 and 46 from the motor circuits in the event that the windings exceed a safe temperature. The motors then continue operation without benefit of the voltage balancing autotransformer 44 but are protected from overspeeding by the relay SR. When the switches B1 and B2 are opened to disconnect the transformer 44, auxiliary contact members on these switches shunt the resistor 48 from the circuit for the actuating coil of the relay SR. Thus, this relay functions to deenergize the actuating coil of the switch M and disconnect the motors from the power source in case of unbalance of the motor voltages as the result of either wheel slippage or of a short circuit or grounds in the motor connections. The relay SR is provided with an interlock which establishes an energizing circuit for a holding coil on this relay, thereby holding it closed until the master controller is returned to the "off" position.

In order to insure that progression of the sequence switch SS is governed by the motor which does not slip and, therefore, has normal accelerating current, the limit relay LR1 is so connected in the motor circuit that it is responsive to the current flowing through the motor 1 and the limit relay LR2 is responsive to the current flowing through the motor 2. The contact members of these two relays are so connected in series that both relays have to close their contact members before the sequence switch can advance to the master step. The opening of the contact members of either relay stops the progression of the sequence switch. Thus, if one axle slips, its limit relay closes its contact members because the current through the motor for that axle is reduced, but the current in the other motor whose axle is presumed not to slip, decreases only if the train speed increases. Thus, its limit relay opens and closes its contact members at normal values and governs the advancement of the control apparatus.

In order to change the calibration of the limit relays in accordance with the operation of the field shunting switches F1 and F2 which, as explained hereinbefore, control the shunting of the main field windings of the motors, the limit relay LR1 is provided with a limit change device LC1 and the limit relay LR2 is provided with a limit change device LC2. The limit change device LC1 comprises a solenoid 51 which controls the tension in a spring 53. Likewise, the limit change device LC2 comprises a solenoid 52 which controls the tension in a spring 54. The spring 53 biases the contact members of the relay LR1 toward their closed position and the spring 54 biases the contact members of the relay LR2 toward their closed position. The energization of the solenoids 51 and 52 is so controlled by interlocking members provided on the switches F1 and F2 that the calibration of the limit relays is properly changed as a result of the operation of the field shunting switches to change the current in the main field windings of the motors.

As explained hereinbefore, the operation of the main field shunting switches F1 and F2, as well as the commutating field shunting switches C1 and C2 is controlled by the relays VR1 and VR2, respectively. The actuating coil of the relay VR1 is connected across the motor 1 and the actuating coil of the relay VR2 is connected across the motor 2. Therefore, these relays are responsive to the voltage of their respective motors which, in turn, is a function of the motor speed.

Since a voltage relay is provided for each motor, the main field shunting switches and the commutating field shunting switches are individually controlled in accordance with the operating conditions of each motor. Therefore, spinning of one motor does not effect the operation of these switches for the other motor which would not be true in case only one voltage responsive relay was provided. The voltage relays VR1 and VR2 and the shunting switches F1, F2, C1 and C2 are provided with the necessary interlocking contact members for securing the desired sequence of operation of these switches during acceleration of the motors. The limit change devices LC1 and LC2 are also provided with contact members for changing the calibration of the voltage relays VR1 and VR2 to insure the proper operation of these relays after the operation of the main field shunting switches.

Accordingly, the main and control circuit connections are such as to maintain the correct main field and commutating field strength on each of the two motors, or multiples thereof, to suit the speed and load conditions under which the motors may be required to operate. Furthermore, the speed of the slipping motor is limited to a safe value by the action of the balancing transformer and the adhesion for the wheels of the trailing axles is increased as a result of the rail cleaning action of the spinning wheels. Also, the slipping motor contributes some tractive effort, thereby adding to the overall tractive effort of the locomotive or vehicle.

The balancing transformer and the motors are protected from excessive unbalance of the motor current and also from excessive unbalance of the motor voltage resulting from wheel slippage or faults in the motor connections.

Since many modifications may be made in the apparatus and arrangement of parts without departing from the spirit of our invention, we do not wish to be limited other than by the scope of the appended claims.

We claim as our invention:

1. In a control system, in combination, a plurality of electric motors connected in series-circuit relation, a balancing transformer having a plurality of windings connected in series-circuit relation, means for connecting each of said motors in parallel-circuit relation to one of said windings, and independently operable current-responsive relays disposed within the parallel connections for the motors.

2. In a control system, in combination, two motors or multiples thereof connected in series-circuit relation, a balancing transformer having a pair of windings connected in series-circuit relation, means for connecting each of said windings in parallel-circuit relation to one of said motors or a multiple thereof, and a current-responsive relay disposed within the parallel connections for each motor or multiple thereof, said relays being independently operable.

3. In a control system, in combination, a pair of electric motors connected in series-circuit relation, a balancing transformer having a pair of windings connected in series-circuit relation, means for connecting each of said windings in parallel-circuit relation to one of said motors, and a current-responsive relay disposed within the parallel connections for each motor, said relays being independently operable and having contact members connected in series-circuit relation in the control system.

4. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, and current-responsive relays disposed within the parallel connections for said motors.

5. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, means for shunting the main field windings of the motors, and means responsive to the operation of said field-shunting means for changing the calibration of said current-responsive relays.

6. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, switching means for shunting the main field windings of the motors, means for recalibrating said current-responsive relays, and means actuated by said switching means for controlling the operation of said recalibrating means.

7. In a control system, in combination, a pair of electric motors connected in series-circuit relation, a balancing transformer having a pair of windings connected in series-circuit relation, means for connecting each of said windings in parallel-circuit relation to one of said motors, and a current-responsive relay disposed within the parallel connections for each motor, the contact members of said current-responsive relays being connected in series-circuit relation in the control system.

8. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, and a voltage responsive relay connected across each motor.

9. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding, and the commutating field winding of said motor, current-responsive relays disposed within the parallel connections for said motors, means for shunting the main field windings of the motors, means responsive to the operation of said field-shunting means for changing the calibration of said current-responsive relays, and relays responsive to the motor voltages for controlling the operation of the field-shunting means.

10. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, switching means for shunting the main field windings of the motors, means for recalibrating said current-responsive relays, and means actuated by said switching means for controlling the operation of said recalibrating means, relays responsive to the motor voltages for controlling the operation of said switching means, and means actuated by said recalibrating means for changing the calibration of said voltage-responsive relays.

11. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, switching means for shunting the main field windings of the motors, means for recalibrating said current-responsive relays, and means actuated by said switching means for controlling the operation of said recalibrating means, means for shunting the commutating field windings of the motors, additional switching means for varying said commutating field shunting means, and relays responsive to the motor voltages for controlling the operation of said switching means and said additional switching means.

12. In a control system, in combination, a plurality of electric motors connected in series-circuit relation, each of said motors having an armature winding, a main field winding and a commutating field winding, a balancing transformer having a pair of windings connected in series-circuit relation, means for connecting each of said motors in parallel-circuit relation to one of said windings, the parallel connections for each motor including the armature winding, the main field winding and the commutating field winding of said motor, current-responsive relays disposed within the parallel connections for said motors, switching means for shunting the main field windings of the motors, means for recalibrating said current-responsive relays, and means actuated by said switching means for controlling the operation of said recalibrating means, means for shunting the commutating field windings of the motors, additional switching means for varying said commutating field shunting means, relays responsive to the motor voltages for controlling the operation of said switching means and said additional switching means, and means actuated by said recalibrating means for changing the calibration of said voltage-responsive relays.

13. In a control system, in combination, a plurality of electric motors connected in series-circuit relation, a balancing transformer having a pair of windings connected in series-circuit relation, switching means for connecting each of said windings in parallel-circuit relation to at least one of said motors, and thermally responsive means for controlling the operation of said switching means to protect the transformer against an excessive unbalance of motor current.

14. In a control system, in combination, a plurality of electric motors connected in series-circuit relation, a balancing transformer having a pair of windings connected in series-circuit relation, switching means for connecting each of said windings in parallel-circuit relation to at least one of said motors, thermally responsive means for controlling the operation of said switching means to protect the transformer against an excessive unbalance of motor current, and a relay responsive to an unbalance of motor voltage for protecting the motors against overspeeding.

15. In a control system, in combination, a plurality of electric motors connected in series-circuit relation, a balancing transformer having a pair of windings connected in series-circuit relation, switching means for connecting each of said windings in parallel-circuit relation to at least one of said motors, thermally responsive means for controlling the operation of said switching means to protect the transformer against an excessive unbalance of motor current, a relay responsive to an unbalance of motor voltage for protecting the motors against overspeeding and means actuated by said switching means for changing the calibration of said relay.

MAURICE F. JONES.
WILLIAM M. HUTCHISON.